UNITED STATES PATENT OFFICE.

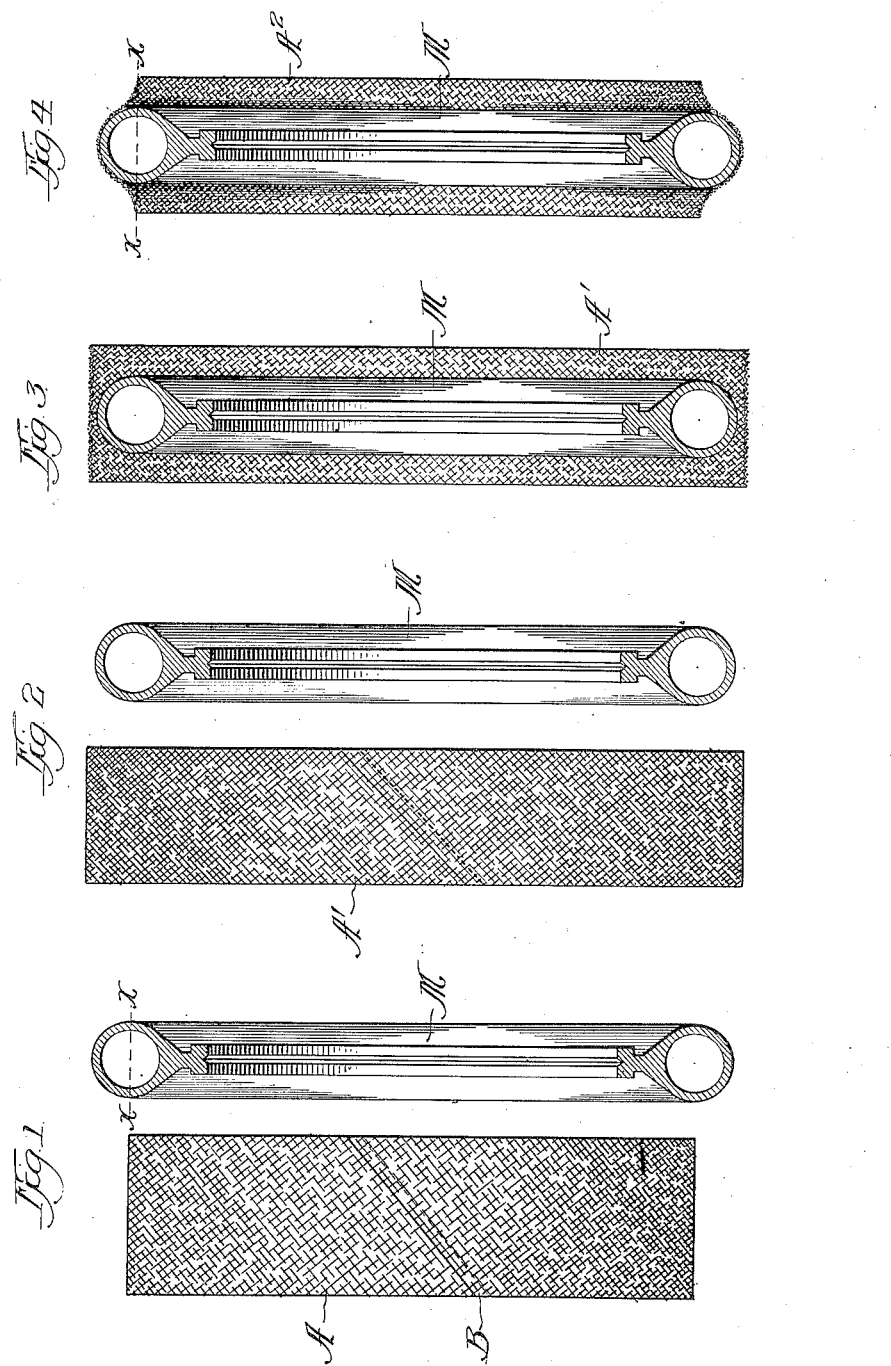

WILLIAM ERASTUS WILLIAMS, OF CHICAGO, ILLINOIS, ASSIGNOR TO THE FIRESTONE TIRE AND RUBBER COMPANY, OF AKRON, OHIO, A CORPORATION OF OHIO.

METHOD OF MAKING TIRE-CASINGS.

1,346,623.   Specification of Letters Patent.   Patented July 13, 1920.

Application filed February 21, 1917. Serial No. 150,265.

*To all whom it may concern:*

Be it known that I, WILLIAM E. WILLIAMS, a citizen of the United States, residing in the city of Chicago, county of Cook, State of Illinois, have invented certain new and useful Improvements in Methods of Making Tire-Casings, of which the following is a specification.

In the manufacture of tire casings made from woven fabric, it is the common practice to cut rubber impregnated woven fabric on the bias, or at an angle of 45° to assemble the cut strips in a continuous length and to form the length of fabric into a roll which is placed in the tire making machine. The fabric is usually drawn from the roll to a revolving core through any suitable friction or tensioning mechanism which, in coöperation with the revolving core, stretches the fabric over the crown or central portion of the core. It is necessary to stretch the fabric over the core in order to enable the same to conform to the curvature of the core and the use of bias fabric enables this shaping to readily and easily be done without wrinkling.

So far as known to me there have been employed three distinct and well defined methods of stretching on the core, each of which has attendant disadvantages. One method has been to pass the fabric between or around rolls which are fitted with some friction brake arrangement. This method is open to several very serious objections. The amount of tension necessary to be placed on the friction roll requires adjustment, which introduces the human element into the tire manufacture. A friction brake will not afford any means for compensating for the varying widths of plies used in the manufacture of tires, nor for the difference in stretchability due to temperature and freshness of the rubber coating or friction. A second method of stretching the fabric on the core is to pass it around a roll which is connected with the shaft on which the core is carried or with some other driving element of the machine, the gearing being so correlated that the stretching roll travels at a rate of speed which is less than the core shaft, whereby the fabric is stretched on the core. This method is perhaps superior to the first method outlined above as there is no variation traceable to differences in the various plies, but no provision has been made for the increasing thickness of the carcass as the plies are built up on the core. The speed of rotation of the core bears a constant ratio to the speed of rotation of the roll over which the fabric is passing, but the peripheral speed of the surface which is pulling the fabric over the stretching roll increases with each revolution of the core, with the result that each ply is stretched a little more than the preceding one with a consequent inequality in the strains and stresses which each ply is called upon to carry.

To correct this evil in the last outlined method a further third practice has been developed, which consists in driving or retarding the stretching roll not from the core shaft, but from a roller bearing upon and driven from the periphery or surface of the core. This has taken care of the increased periphery of the tire as it is constructed but has, in turn, introduced several elements into the stretching of the fabric which make the method unreliable. The driving or retarding roller running on the surface of the core has been subjected to the action of each splice or overlap in the ply, the effect of which is transmitted back to the stretching roller and causes a perceptible variation in the rotation of that roller, which in turn has been transmitted to the fabric.

In each of the last two methods of stretching as explained above a further disturbing element which has affected the stretch has been that each splice on the core in passing up under the ply as it goes to the core has caused a variation in the stretch of the fabric. All of the methods adaptable for machine manufacture have required the use of a continuous strip of bias fabric. After a ply has been laid it is necessary to cut the fabric between the core and the stretching roller, which has released the end of the fabric from the tensioning pull and has relieved the stretch on the last end of the ply, which introduces a further element of uncertainty and positive inaccuracy in the stretch of the fabric. Further, in passing from a flat stretching roll to a curved rotating core it has been found advisable to introduce an element into the machine to remove longitudinal wrinkles or folds which occur between the stretching roll and the core incident to the reshaping of the fabric. This has consisted of a means for stretching the fabric transversely, or a shaping horn or shoe which gradually conforms the fabric to the rounded cross section of the core. Either element resorted to has introduced a further element of uncertainty and cause for variation in the stretch of the fabric, and necessitates a certain amount of handling between the stretching roller and the core.

I consider evenness and accuracy in the stretch of each and every ply going into the tire carcass as one of the most important requirements for a perfect tire. Each and every layer which withstands the stresses incident to use should be accurately and evenly stretched so that the individual elements of each ply will bear its proportion of the load. To accomplish this desired result I have devised the method of making tires which is here described. By this method I am enabled to obtain a definite and positive stretch for each ply which can be calculated with the greatest nicety and each ply is stretched uniformly throughout every portion of its circumference, whereby, not only each ply bears its full share of the work, but each and every part of the ply shares the proportion of the load required of it.

In the drawings accompanying this application is shown the stretching and application of the first ply of woven fabric to the core, it being understood that the stretching and application of the subsequent plies is done in the same manner. This method is also suitable for use with any type of fabric, and is not necessarily restricted to woven fabric. In these drawings there is shown only the stretching and application of the fabric and not the forming or shaping of the edges or skirts to the sides of the core in the final step and which may be done in any desired manner.

In the drawings:

Figure 1 shows the fabric in normal condition ready to be stretched and applied to the core, which is shown beside the fabric, giving a conception of the manner in which it is possible to accurately determine the stretch.

Fig. 2 shows the fabric stretched and ready to be applied to the core.

Fig. 3 shows the fabric in stretched condition over the core, and

Fig. 4 shows the fabric released onto the core and ready for the shaping of the edges or skirts.

In shaping a flat woven fabric to an annular core which is rounded in cross section it is understood that the bias fabric is elongated peripherally about the crown of the core, and elongated radially toward the center of the core. The transition from elongation in one direction to elongation in the other direction is gradual, and it is evident that at some one point the fabric attains a neutral line where there is no stretch in either direction. If the neutral line of the fabric coincides with the median or equator of the tire, there will be equal amount of elongation on the tread and the beads at right angles to one another.

In forming a tire I take a straight length of fabric equal in length to a circumference of the core M at the neutral line, indicated at $x$—$x$ in Figs. 1 and 4, plus enough to make a good overlap or splice. This length of fabric is then formed into a ring A, spliced as at B, which ring, if placed as shown in Fig. 1, will coincide with the median line of the core. If it is desired to bring the neutral line of the fabric above or below the median line of the core the fabric ring is made larger or smaller. By making the fabric into a ring or band of predetermined circumference I am enabled to accurately determine the location of its neutral line in the formed tire.

By the use of any suitable means I now stretch the band of fabric until it is the same size or slightly greater in circumference than the outside periphery of the core. The fabric in its stretched condition is shown at A' in Fig. 2. While still held in its stretched condition it is projected onto or placed around the core in any suitable manner. The core may be held stationary while this is being done. The stretching and application may be done simultaneously; that is, the core may be introduced into the ring as fast as the stretching occurs from the entering side. It is not essential to my process that the whole width of fabric be stretched, but it is possible to stretch the skirt on one side only to admit of placing of the core. The core and the fabric are brought into accurate registry with the center line of the fabric over the center line of the core.

The expanding or stretching is now relaxed, preferably simultaneously at all points, and the fabric allowed to contract into snug embracing engagement with the periphery of the core. Wherever the core is placed the fabric is stretched over it. This will bring the neutral line of the fabric on the core to a point coinciding with the original circumference of the ring, as shown in Fig. 1. In this instance it will coincide with the median line of the core $x$—$x$. The fabric will shape itself smoothly and evenly about the core to the line $x$—$x$ and the skirts will stand free of the core, the fabric assuming the shape indicated at $A^2$ in Fig. 4.

The first ply is now ready for the shaping operation which may be done in any suitable manner. The second and subsequent plies are then applied in the same manner and shaped as desired.

It will be found that by this method of manufacturing I am enabled to obtain a better tire carcass than by any in practice known to me. The percentage of stretch is readily and accurately determinable and I am enabled to distribute the stretch uniformly throughout each ply.

While the description contained in this application has referred to woven fabric such as used in the manufacture of fabric tires, the invention is not confined to operations on this type of material, but may be used on any form of fabric from which tires can be made.

It is understood that changes and modifications may be made in the method as shown herein, without departing from the invention or sacrificing any of its benefits.

Claims:

1. The method of making tire casings from fabric, comprising forming said fabric into a ring of smaller circumference than a core, exerting an expanding force on the ring, relaxing said force simultaneously at all points about the ring and allowing the center of the ring to shape itself to the center of the core, and then shaping the skirts of the fabric to the core.

2. The method of making tire casings, comprising forming fabric into a ring, expanding the ring to a circumference greater than the outer periphery of a core, placing the ring while in expanded condition about the core, relaxing the fabric so that it will contract about the core.

3. The method of making tire casings, comprising forming fabric into a ring, expanding the ring to a circumference greater than the outer periphery of a core, placing the ring while in expanded condition about the core, centering the ring with respect to the core, and relaxing the fabric so that it will contract about the core.

4. In the making of fabric tire casings, the steps of taking a core and a ring of fabric material which in its normal untensioned condition is of less diameter than the diameter of the core, expanding the ring of material to a diameter exceeding that of the core, telescopically assembling the core and the ring in its expanded condition, and permitting the ring to contract upon the core.

5. A method for use in the manufacture of tires, comprising forming tire material into a ring, expanding the ring to a circumference greater than the outer periphery of the core, placing the ring while in expanded condition about the core, and relaxing the material so that it will contract on to the core.

WILLIAM ERASTUS WILLIAMS.

Witnesses:
ALBERT J. SAUSER,
M. L. LOCHRIE.